United States Patent
Halse

(10) Patent No.: US 10,843,207 B2
(45) Date of Patent: Nov. 24, 2020

(54) METHOD AND APPARATUS FOR REMOVAL OF SEA LICE FROM LIVE FISH

(71) Applicant: COOKE AQUACULTURE INC., Blacks Harbour (CA)

(72) Inventor: Joel Halse, Saint Andrews (CA)

(73) Assignee: COOKE AQUACULTURE INC., Blacks Harbour, CA (US)

( * ) Notice: Subject to any disclaimer, the term of this patent is extended or adjusted under 35 U.S.C. 154(b) by 524 days.

(21) Appl. No.: 15/129,547

(22) PCT Filed: Mar. 27, 2015

(86) PCT No.: PCT/CA2015/000213
§ 371 (c)(1),
(2) Date: Sep. 27, 2016

(87) PCT Pub. No.: WO2015/143549
PCT Pub. Date: Oct. 1, 2015

(65) Prior Publication Data
US 2017/0172114 A1      Jun. 22, 2017

Related U.S. Application Data

(60) Provisional application No. 61/967,852, filed on Mar. 28, 2014.

(51) Int. Cl.
| | |
|---|---|
| *A01K 61/13* | (2017.01) |
| *B05B 1/02* | (2006.01) |
| *A01K 61/00* | (2017.01) |
| *A01K 63/04* | (2006.01) |
| *A01K 63/06* | (2006.01) |

(Continued)

(52) U.S. Cl.
CPC ............... *B05B 1/02* (2013.01); *A01K 61/00* (2013.01); *A01K 61/13* (2017.01); *A01K 63/04* (2013.01);
(Continued)

(58) Field of Classification Search
CPC ........ A01K 61/00; A01K 61/13; A01K 63/04; A01K 63/065
(Continued)

(56) References Cited

U.S. PATENT DOCUMENTS

| | | | | |
|---|---|---|---|---|
| 3,313,301 A | * | 4/1967 | Jefferts | A01K 11/006 |
| | | | | 119/215 |
| 3,859,522 A | * | 1/1975 | Cuthbert | B07C 5/342 |
| | | | | 250/223 R |

(Continued)

FOREIGN PATENT DOCUMENTS

| | | |
|---|---|---|
| CA | 2834251 A1 | 11/2012 |
| CL | 2012003502 A1 | 5/2013 |

(Continued)

OTHER PUBLICATIONS

EESR of the corresponding EP Application No. 15768342.6 dated Oct. 24, 2017.
(Continued)

*Primary Examiner* — Ebony E Evans
(74) *Attorney, Agent, or Firm* — Bereskin & Parr LLP

(57) ABSTRACT

A fish delousing installation includes a warm water source, and a fish slide for fish to slide down. The fish slide has a fish inlet, a fish outlet, and a slide length defined therebetween. A plurality of shower nozzles are in communication with the warm water source and are positioned to shower the fish with warm water as the fish slide from the fish inlet to the fish outlet.

9 Claims, 2 Drawing Sheets

(51) Int. Cl.
*B08B 3/02* (2006.01)
*C02F 1/00* (2006.01)
*C02F 103/08* (2006.01)

(52) U.S. Cl.
CPC .............. *A01K 63/065* (2013.01); *B08B 3/02* (2013.01); *C02F 1/001* (2013.01); *C02F 2103/08* (2013.01); *Y02A 40/81* (2018.01); *Y02A 40/814* (2018.01)

(58) Field of Classification Search
USPC .................................. 119/215, 216, 219, 220
See application file for complete search history.

(56) References Cited

U.S. PATENT DOCUMENTS

| | | |
|---|---|---|
| 5,313,911 A | 5/1994 | Thomassen et al. |
| 10,051,843 B2 * | 8/2018 | Lindgren ............... A01K 61/13 |

FOREIGN PATENT DOCUMENTS

| | | | |
|---|---|---|---|
| JP | 2008011764 A | 1/2008 | |
| WO | 9417657 A1 | 8/1994 | |
| WO | 9824304 A1 | 6/1998 | |
| WO | 9941976 A2 | 8/1999 | |
| WO | 2005124032 A1 | 12/2005 | |
| WO | 2010087722 A1 | 8/2010 | |
| WO | 2011099865 A1 | 8/2011 | |
| WO | 2012148283 A1 | 11/2012 | |
| WO | WO2015043603 A * | 4/2015 | ............. A01K 61/00 |

OTHER PUBLICATIONS

Office Action issued on corresponding Chile Patent Application No. 201602457.

International Search Report issued on PCT/CA2015/000213 dated May 26, 2015.

* cited by examiner

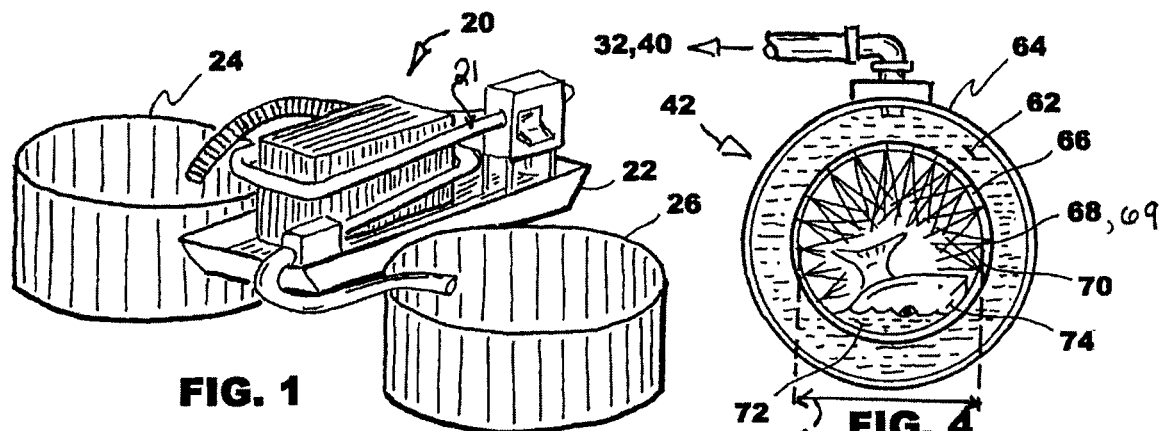
FIG. 1
FIG. 4
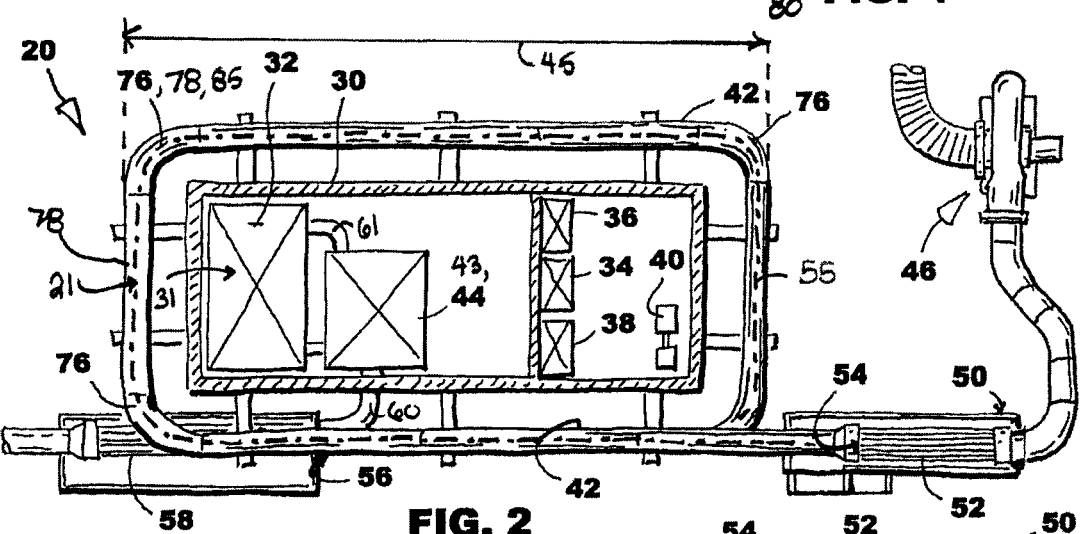
FIG. 2
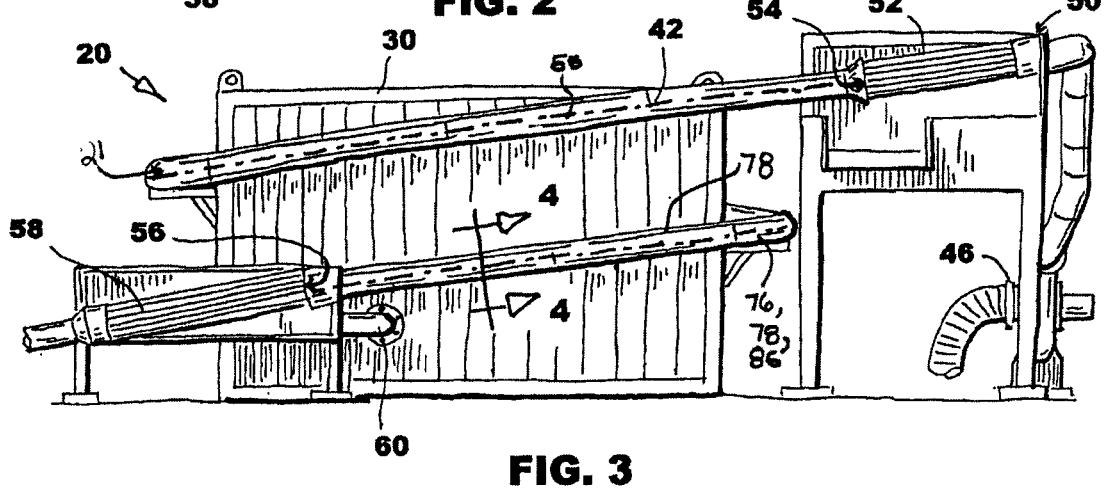
FIG. 3

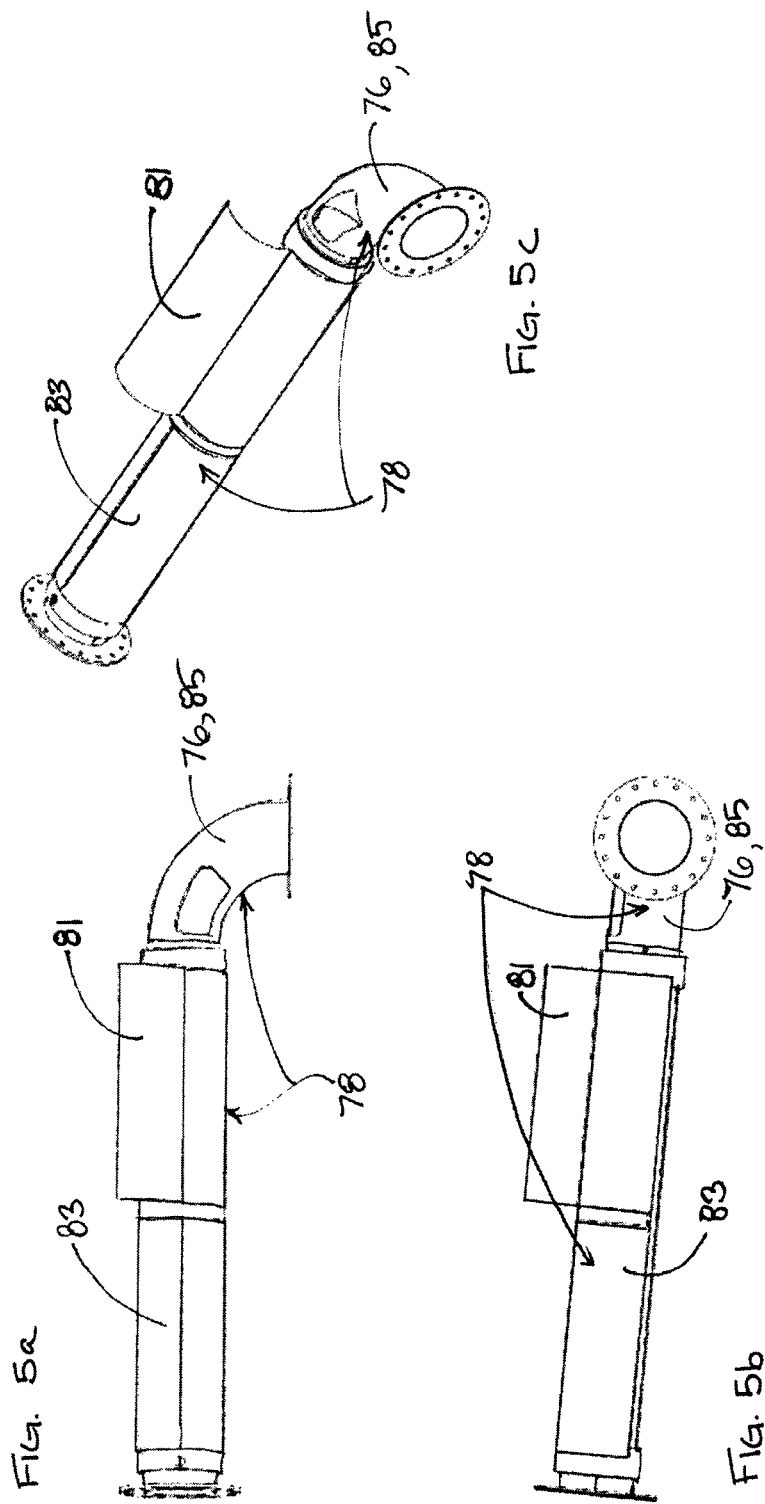

METHOD AND APPARATUS FOR REMOVAL OF SEA LICE FROM LIVE FISH

CROSS REFERENCES TO RELATED APPLICATIONS

This application is a national phase entry of PCT Patent Application No. PCT/CA2015/000213, filed Mar. 27, 2015, which claims the benefit of U.S. Provisional Patent Application No. 61/967,852, filed on Mar. 28, 2014, which is incorporated herein by reference its entirety.

FIELD

The disclosure relates to fish farming, and more particularly, to installations and methods for the removal of sea lice from farmed fish such as Atlantic salmon.

BACKGROUND

Sea lice can be removed from the surfaces of farmed live fish by exposing the sea lice to warm water.

Canadian Patent No. CA 2,834,251 (Ulriksen) purports to disclose a lice treatment system for marine organisms, such as fish. The system is a closed system comprising: an inlet for fish that shall be treated, a first separator to separate the fish and water and which is arranged after the inlet, a pipeline for the transport of the fish, in which, at least one part of the pipeline constitutes a liquid bath for the fish and which is arranged to receive the treatment liquid, a second separator to separate the fish and the treatment liquid, an outlet for the discharge of the treated fish and which is arranged after the second separator, and a circulation pump for the circulation of the treatment liquid in the closed system. The part of the pipeline that constitutes the liquid bath is formed in a U-shape so that a liquid bath with respective liquid surfaces is formed.

In equipment such as that described in CA 2,834,251, the exposure time of the fish to the warm water can vary from one fish to the next. For example, fish entering the bath can swim forward in a straight line to the outlet, thereby reducing their exposure time to the warm water. This may result in less than optimal removal of sea lice from these fish. On the other hand, fish can also swim back from the outlet towards the inlet, or rest in place, thereby extending their exposure time to the warm water. This may result in harm or stress to the fish.

SUMMARY

The following summary is intended to introduce the reader to various aspects of the applicant's method and apparatus. Examples of embodiments are provided below.

According to one aspect, a fish delousing installation is disclosed. The installation delouses fish, such as salmon, to remove pests such as sea lice. The fish delousing installation comprises a warm water source, and a fish slide for fish to slide down. The fish slide has a fish inlet, a fish outlet, and a slide length defined therebetween. A plurality of shower nozzles are in communication with the warm water source and are positioned to shower the fish with warm water as the fish slide from the fish inlet to the fish outlet.

The fish slide may be tubular.

The shower nozzles may be positioned at a plurality of spaced apart positions along the slide length. The shower nozzles may be positioned to shower the fish generally continually as they slide down the length from the fish inlet to the fish outlet. The shower nozzles may span a majority of the length.

The fish slide may have a width transverse to the slide length, and the shower nozzles may be positioned at a plurality of spaced apart positions along the width. The fish slide may be circular in transverse section and may comprise an inner circumference. The shower nozzles may be positioned at a plurality of spaced apart positions along the inner circumference. The shower nozzles may span only a portion of the inner circumference. The shower nozzles may span at most 270 degrees of the inner circumference.

The fish slide may comprise at least one pipe through which the fish slide. The fish slide may comprise at least one inner pipe through which the fish slide, and at least one outer pipe concentric with the inner pipe and defining an annular conduit between the inner pipe and the outer pipe. The warm water source may be in communication with the annular conduit, and the shower nozzles may each comprise an aperture through a wall thickness of the inner pipe.

The fish slide may be of a negative slope along the entirety of the slide length. In other examples, the fish slide may have an upstream portion of a first negative slope, and a downstream portion of a second negative slope that is less than the first negative slope.

The fish slide may not include any portions that are of a positive slope.

The fish slide may not include any warm water pooling portions.

The slide length and slope of the fish slide may be tuned so that a fish transit time between the fish inlet and the fish outlet is less than 30 seconds. The slide length and slope of the fish slide may be tuned so that the fish transit time is about 25 seconds.

The warm water source may maintain the warm water at between 30 degrees C. and 40 degrees C. The warm water source may maintain the warm water at about 34 degrees C., or about 33 degrees C., or about 32 degrees C.

The slide length may be at least 72 feet.

The fish slide may have a slide footprint, the slide footprint may have a footprint length, and the fish slide may include a plurality of bends such that the footprint length is less than the slide length. The footprint length may be at most one half of the slide length. The fish slide may be bent such that the slide footprint is generally rectangular.

The installation may further comprise a seawater separator upstream of the fish inlet for separating seawater from the fish prior to the fish entering the fish slide.

The installation may further comprise a used warm water separator downstream of the fish outlet for separating used warm water from the fish after the fish have exited the fish slide.

The installation may further comprise a sea lice separator downstream of the second water separator for removing sea lice from the used warm water.

The installation may further comprise a recycle line downstream of the sea lice separator for feeding used and deloused warm water back to the warm water source.

According to another aspect, a treatment section of a fish delousing installation is disclosed. The treatment section comprises a fish slide having a fish inlet, a fish outlet, and a slide length defined therebetween. The treatment section further comprises a plurality of shower nozzles for showering the fish in the fish slide. The plurality of shower nozzles are positioned at a plurality of spaced apart positions along the slide length and shower the fish as they slide down the slide length from the fish inlet to the fish outlet.

The shower nozzles may be positioned to shower the fish generally continually as they slide down the length. The shower nozzles may span a majority of the length.

The fish slide may have a width transverse to the slide length, and the shower nozzles may be positioned at a plurality of spaced apart positions along the width. The fish slide may be circular in transverse section and may comprise an inner circumference. The shower nozzles may be positioned at a plurality of spaced apart positions along the inner circumference. The shower nozzles may span only a portion of the inner circumference. The shower nozzles may span at most 270 degrees of the inner circumference.

The fish slide may comprise at least one pipe through which the fish slide. The fish slide may comprise an inner pipe through which the fish slide, and an outer pipe concentric with the inner pipe and defining an annular conduit between the inner pipe and the outer pipe. The warm water source may be in communication with the annular conduit, and the shower nozzles may each comprise an aperture through the wall thickness of the inner pipe.

The fish slide may be of a negative slope along the entirety of the slide length. In other examples, the fish slide may have an upstream portion of a first negative slope, and a downstream portion of a second negative slope that is less steep than the first negative slope.

The fish slide may not include any portions that are of a positive slope.

The fish slide may not include any warm water pooling portions.

The slide length and slope of the fish slide may tuned so that a fish transit time between the fish inlet and the fish outlet is less than 30 seconds. The slide length and slope of the fish slide may be tuned so that the fish transit time is about 25 seconds.

The warm water source may maintain the warm water at between 30 degrees C. and 40 degrees C. The warm water source may maintain the warm water at about 34 degrees C., 33 degrees C., or 32 degrees C.

The slide length may be at least 72 feet.

The fish slide may have a slide footprint, the slide footprint may have a footprint length, and the fish slide may include a plurality of bends so that the footprint length is less than the slide length. The footprint length may be at most one half of the slide length. The fish slide may be bent so that the slide footprint is generally rectangular.

According to another aspect, a method for fish delousing is disclosed. The method comprises moving fish from an inlet of a warm water treatment section to an outlet of a warm water treatment section while maintaining the fish in a non-swimming mode, and showering the fish with warm water as they are moved to detach sea lice therefrom.

In step a), the fish may slide down a fish slide. The fish may have a fish transit time in the fish slide of at most about 30 seconds, or of at most about 25 seconds.

Step b) may comprise showering the fish with water at between 30 degrees Celsius and 40 degrees Celsius. Step b) may comprise showering the fish with water at about 32 degrees Celsius, 33 degrees Celsius, or 34 degrees Celsius.

The method may further comprise flowing a shallow stream of water on the fish slide.

The method may further comprise, prior to step a), separating seawater from the fish.

The method may further comprise c) after step b), separating used warm water from the fish.

The method may further comprise, after step c): d) separating the detached sea lice from the used deloused warm water, and recycling the used deloused warm water back to step b).

According to another aspect, a method for removing sea lice from live fish is disclosed. The method comprises the step of exposing said live fish to a shower of warm water at a temperature of between 30° C. to 40° C. for a period of time not exceeding 30 seconds, while maintaining said fish in a non-swimming mode.

According to another aspect, an installation for removing sea lice from live fish is disclosed. The installation comprises a water slide for conveying said live fish therein, at least one shower of warm water operating in said water slide for exposing said live fish being conveyed in said water slide to a shower of warm water, and a stream of warm water flowing in said water slide. Said stream of warm water is sufficiently shallow for preventing said fish being conveyed in said water slide from swimming. Said water slide and said stream of warm water are calibrated to convey said live fish along said water slide in less than 30 seconds.

BRIEF DESCRIPTION OF THE DRAWINGS

The drawings are for illustrating various examples of articles, methods, and apparatuses of the present specification and are not intended to limit the scope of what is taught in any way. In the drawings:

FIG. 1 is a schematic perspective view of an example lice treatment installation floating between two fish cages;

FIG. 2 is a plan view of the lice treatment installation of FIG. 1;

FIG. 3 is an elevation view of the lice treatment installation of FIG. 1;

FIG. 4 is a cross-section view through the fish slide of the lice treatment installation, taken along line 4-4 in FIG. 3; and FIG. 5a is a top plan view of a pair of pipe sections of the lice treatment installation of FIG. 1;

FIG. 5b is a side elevation view of the pipe sections of FIG. 5a; and

FIG. 5c is a perspective view of the pipe sections of FIG. 5a.

DETAILED DESCRIPTION

The present application relates to methods and apparatuses for the removal of parasites from live fish, such as live farmed fish. The fish may be any type of fish, such as, but not limited to, salmon (including Atlantic and Pacific salmon), brown trout, and arctic char. In some particular examples, the fish are farmed Atlantic salmon (*Salmo salar*) or a species of Pacific salmon, such as Chinook (*Oncorhynchus tshawytscha*) or Coho (*Oncorhynchus kisutch*).

The parasites which are removed from the fish may be sea lice, such as but not limited to *Lepeophtheirus salmonis*, *Caligus clemensi* and *Caligus rogercresseyi*.

Sea lice can be removed from the surfaces of farmed live fish by exposing the sea lice to warm water for a relatively short period of time. The warm water induces the sea lice to detach from the fish. Juvenile and adult-stage sea lice do not have the same resistance to warm water treatment, and juvenile sea lice are more difficult to treat than adult sea lice.

The present application relates to a method and apparatus (also referred to herein as an installation) for the removal of sea lice (including eggs, juveniles, and adults) from live fish in which fish are moved from an inlet of a warm water treatment section to an outlet of a warm water treatment section, while maintained in a non-swimming mode (i.e. the fish generally cannot swim, as they are not immersed fully or substantially in water. The fish may flap their tails and generate some additional forward motion, but this is typically by applying force to the pipe, not generating forward motion by moving fins and applying force against the stream of water flowing through the slide with them. This forward movement is considered to be a non-swimming mode). The fish are showered with warm water (i.e. water at a temperature of between 20 degrees C. and 40 degrees C.) as they are moved through the warm water treatment section, to detach sea lice therefrom. More specifically, the fish are showered with warm water while sliding down a fish slide. Movement of the fish down the slide is generally driven by gravity, and the time period that the fish spend in the slide (also referred to herein as a "transit time" or "fish transit time") can be controlled by tuning the length and incline of the slide, amongst other factors.

The water temperature and the transit time can be selected to optimize the removal of both juvenile and adult sea lice from the fish. For example, it has been determined that a substantial amount of sea lice can be removed with a transit time of between about 15 and 30 seconds, more specifically between about 20 and 25 seconds, and a water temperature of between about 20 degrees C. and about 40 degrees C., more specifically between about 30 degrees C. and 40 degrees C., even more specifically between about 31.5 and 34.5 degrees C., and even more specifically at about 32 degrees C., 33 degrees C., or 34 degrees C. In some examples, a relatively high water temperature and relatively short transit time may be selected, for example a water temperature of about 35 degrees C. and a transit time of about 15 seconds. In other examples, a relatively low water temperature and relatively long treatment time may be selected, for example a water temperature of about 25 degrees C. and a treatment time of about 30 seconds. In some particular examples, the water temperature may be about 34 degrees C., and the transit time may be about 25 seconds. In other examples, the water temperature may be about 32 degrees C. and the transit time may be about 20 seconds. It has been determined that by using the methods and apparatus described below, the vast majority of sea lice, for example up to 87% of sea lice can be removed from fish with a water temperature of 34 degrees Celsius and a transit time of about 25 seconds.

Referring to the drawings, an example lice treatment installation 20 is shown. The lice treatment installation 20 may also be referred to herein as a "fish delousing installation", or simply as an "installation". The installation 20 is mounted on a barge 22, as can be seen in FIG. 1. The barge 22 is stabilized between two floating fish cages 24, 26. The fish from cage 24, for example, may be pumped or otherwise delivered to the installation 20 to remove sea lice therefrom. The treated fish may be released into fish cage 26. Then, the barge 22 may be relocated to between fish cage 24 and another fish cage (not shown), where the process may be repeated using cage 24 as the post-treatment cage.

In the example shown, the installation 20 generally includes a seawater separator 52 for separating seawater from the incoming fish, a treatment section 21 downstream of the seawater separator 52 and in which the sea lice are removed from the fish by exposure to warm water, a warm water source 31 for supplying warm water to treatment section 21, a used warm water separator 58 downstream of the treatment section 21 for removing the used warm water from the treated fish, a sea lice separator 44 for removing sea lice from the used warm water, and a recycle line 61 downstream of the sea lice separator 44 for feeding the used and deloused warm water back to the warm water source 31. The removed sea lice may be captured and destroyed.

Referring to FIGS. 2, 3 and 4, in the example shown, the lice treatment installation 20 has a central enclosure 30. The central enclosure 30 contains the warm water source 31, which in this example includes a warm water reservoir 32, a boiler or water heater 34, a heat exchanger 36, and a control system 38 for maintaining the water of the reservoir 32 at a desired temperature (for example between 30 degrees Celsius and 40 degrees Celsius). A pump 40 and appropriate piping (not shown) pump the warm water from the reservoir 32 to a water slide 42 (also referred to herein as a "fish slide") of the treatment section 21. The pressure and flow rate of the warm water to the fish slide 42 may be controlled by a user. The warm water may also contain one or more additives, introduced thereto by an appropriate mixer (not shown) mounted in the central enclosure 30.

In the example shown, the central enclosure 30 also contains the sea lice separator 44, which may be a drum-type filter 43 that removes sea lice from the used warm water, before returning the used warm water to the reservoir 32.

A fish pump 46 may be used to convey fish through hoses from fish cage 24 to the inlet end 50 of the installation 20. The inlet end 50 is upstream of the seawater separator 52, which, as mentioned above, separates seawater from the fish prior to the fish entering the fish slide 42. In the example shown, the seawater separator 52 includes a pipe that is porous (also referred to as a seawater separator pipe) to allow seawater to drain therethrough. The fish move through the seawater separator 52 under the force of gravity into the treatment section 21. The drained seawater may be filtered to capture any sea lice therein, before returning the drained seawater to the marine environment.

The treatment section 21 includes the fish slide 42, and a plurality of shower nozzles 69, described in further detail below. The fish are showered with warm water from the shower nozzles 69 as they slide down the fish slide 42, and the warm water induces the sea lice to detach from the fish.

The fish slide 42 has a fish inlet 54 (also referred to as an "inlet end"), a fish outlet 56 (also referred to as a discharge end), and a slide length 55 defined therebetween. The fish slide 42 is sloped and extends from the fish inlet 54, around the central enclosure 30, and to the fish outlet 56. Fish are moved along the fish slide 42 from the fish inlet 54 to the fish outlet 56 under the force of gravity.

As mentioned above, the fish slide 42 is sloped between the fish inlet 54 and the fish outlet 56. In the example shown, the fish slide 42 is of a negative slope along the entirety of the slide length 55. The fish slide 42 does not include any portions that are of a positive slope, and does not include any portions in which warm water may pool (also referred to as 'warm water pooling portions'). This may prevent or inhibit the fish from swimming, and may maintain the fish in a non-swimming mode. As used herein the term "non-swimming mode" indicates that the fish are not fully or substantially submerged or immersed in water, and therefore cannot swim.

In the example shown, the slope is constant along the slide length 55. For example, the slope of the slide may be between about negative 0.050 and negative 0.250 (i.e. the slide may drop between about 0.6 inches and about 3 inches for every foot of length), or between about negative 0.060 and negative 0.350, or between negative 0.040 and negative 0.150, or between about negative 0.06 and negative 0.15 along the entirety of the slide length 55, or a range between these increments. In alternative examples, the slope may vary along the slide length 55. For example, the slide may have an upstream portion of a first negative slope, and a downstream portion of a second negative slope that is less than the first negative slope (not shown). This may allow for the fish to build up to a desired speed at the upstream portion of the fish slide 42. For example, the first negative slope may be between about negative 0.10 and about negative 0.15, or between about negative 0.15 and about negative 0.20, or between about negative 0.20 and about negative 0.25, or a range between these increments. The second negative slope may be between about negative 0.060 and about negative 0.065, or between about negative 0.065 and negative 0.070, or between about negative 0.070 and negative 0.10, or a range between these increments.

In some examples, the slide length may be at least 72 feet, or between about 72 feet and about 80 feet, or between about 80 feet and about 95 feet, or between about 90 feet and about 100 feet, or between about 100 feet and about 120 feet, or a range between these increments.

As mentioned above, the fish slide 42 extends around the central enclosure 30. More specifically, in the example shown, the fish slide 42 does not extend linearly, and is bent so that generally it wraps around the central enclosure 30. The bends in the fish slide 42 are of about 90 degrees, and are formed by elbow joints 76. Bending the fish slide 42 allows the fish slide 42 to fit in a more compact space in a lengthwise direction. That is, the fish slide 42 has a slide footprint that is generally rectangular, as can be seen in FIG. 2. The slide footprint has a footprint length 45, and the footprint length 45 is less than the overall slide length 55. This allows the installation to fit on barge 22.

As mentioned above, a used warm water separator 58 is downstream of the fish outlet 56 of the fish slide 42 for separating used warm water from the fish after the fish have exited the fish slide 42. The used warm water separator 58 includes a pipe that is porous, and allows used warm water to drain therethrough. The recovered used warm water is transported through drain pipe 60 into the drum filter 43 where sea lice are removed for destruction. A recycle line 61 is downstream of the drum filter 43, and the used and deloused warm water may then be recycled via recycle line 61 back to the warm water source.

Referring now particularly to FIGS. 4 and 5*a* to 5*c*, the fish slide 42 may include at least one pipe through which the fish slide. In the example shown, the fish slide 42 is made of a plurality of pipe sections 78 (only two pipe sections are labelled in FIG. 4), including straight sections 83, and bent sections 85 formed by the elbow joints 76. The pipe sections 78 are spaced apart along the slide length 55, and each pipe section 78 includes an inner pipe 66 and an outer pipe 64 that is concentric with the inner pipe 66. The inner pipe 66 (also referred to as an inside pipe) and outer pipe 64 form a double wall with a hollow annular conduit 62. The inner pipe 66 and outer pipe 64 may, for example, be made from a metal such as stainless steel, or a plastic such as HDPE (high density polyethylene). The inner surface of the inner pipe 66 may be relatively smooth. For example, it may be polished or coated with a gel coat. Furthermore, the joints between the pipe sections may be relatively smooth.

In some examples, the inner pipe 66 may have an inside diameter of between about 10 inches and about 15 inches. The inside diameter of the inner pipe 66 may be selected based on the size and quantity of fish to be treated per unit of time.

In some examples, the radial thickness of the annular conduit 62 may be between about 0.25 inches and about 1 inch.

A plurality of shower nozzles 69 are in communication with the warm water source 31, and produce a series of showers 70 of warm water inside the fish slide 42, which shower the fish 74 as the fish 74 slide from the fish inlet 54 to the fish outlet 56. In the example shown, the annular conduit 62 is in fluid communication with the warm water source 31. More specifically, the annular conduit 62 is supplied with warm water from the warm water reservoir 32 by pump 40. The inner pipe 66 has an array of radial orifices 68 (also referred to as apertures) extending through the wall thickness thereof. Each orifice 68 forms a shower nozzle 69, which showers the fish 74 with warm water from the annular conduit 62.

The pressure of the water showering the fish 74 may be adjusted by adjusting the pressure of the pump 40. The pressure may be selected so that the fish 74 are relatively gently showered with warm water, as opposed to being sprayed with significant force. In some examples, the pump 40 may be tuned so that the pressure in the annular conduit 62 is about 2 psi.

In the example shown, the shower nozzles 69 are positioned at a plurality of spaced apart positions along the slide length 55, so that the fish 74 are showered generally continually as they slide down the fish slide 42 from the fish inlet 54 to the fish outlet 56. As used herein, the term "continually" indicates that the fish 74 are showered for at least the majority of their transit time in the fish slide 42. In the example shown, the shower nozzles 69 are positioned to span a majority of the slide length 55. Particularly, in the example shown, the shower nozzles extend the full length of each straight section of the fish slide 42. In the example shown, the elbows 76 do not include shower nozzles. In alternative examples, the elbows 76 may include shower nozzles.

The fish slide 42 has a width 80 transverse to the length 55, and in the example shown, the shower nozzles 69 are also positioned at a plurality of spaced apart positions along the width 80. More specifically, the fish slide 42 is circular in transverse section (i.e. the fish slide 42 is tubular), and comprises an inner circumference. The shower nozzles 69 are positioned at a plurality of spaced apart positions along the inner circumference. In the example shown, the shower nozzles 69 are positioned to span only a portion of the inner circumference, so that they shower the fish from above and from the sides. For example, the shower nozzles 69 may be positioned to span at most about 270 degrees of the inner circumference, and may extend at most over an upper circumferential 270 degree section of the fish slide 42.

In alternative examples the shower nozzles 69 may be positioned in an alternative configuration. For example, at any given position along the slide length 55, there may be only a single nozzle 69. The nozzles 69 may be, for example, arranged linearly along the slide length 55, and at an upper circumferential section of the inner pipe 66, so that the fish are showered from above.

In the example shown, the lower circumferential section of the fish slide 42 does not include any shower nozzles. A shallow stream of warm water 72 flows along the lower circumferential section of the fish slide 42, to encourage fish 74 to slide in the fish slide 42.

In some examples, the size, quantity and spacing of orifices 68 are selected so that the stream of warm water 72 in the fish slide 42 is kept as shallow as possible to prevent or inhibit the fish from swimming.

Referring to FIGS. 5*a* to 5*c*, in the example shown, the straight sections 83 include an access door 81. The access door 81 may be opened for cleaning, inspection, or servicing of the inner pipe 66, outer pipe 64, or annular conduit 62.

As mentioned above, the slope of the fish slide 42 and slide length 55 may in some examples be tuned to provide a transit time in the fish slide of at most about 30 seconds, for example of about 25 seconds.

In some examples (not shown), the installation 20 may include additional filters at various places in the assembly. For examples, a fine screen bag filter may be provided between the warm water source 31 and the treatment section 21.

The operating parameters of the installation 20 can be adjusted such that all, most, or many fish moving along the fish slide 42 are treated with the same amount or a similar amount of warm water for the same or a similar time. Efficient lice removal can be obtained, generally without injuring or causing severe discomfort or stress to the fish, or with minimal injury, discomfort, or stress to the fish.

EXAMPLES

An installation in accordance with FIG. 1 was tested in order to (1) determine the efficacy of lice removal at a range of temperatures, and (2) estimate preliminary overall lice removal numbers.

Methods

An installation in accordance with FIG. 1 was installed on a 95 foot barge. The slide length was 92 feet overall, including 72 feet of straight sections having shower nozzles, and 20 feet of elbow joints without shower nozzles.

Two trials were carried out. In both trials, fish (Atlantic Salmon) were taken from a first cage, treated in the installation, and returned to a second cage.

In Trial 1, 10 fish (weighing 3-4 kg each) were anaesthetized and counts of chalimus, mobile stages, and adult females of *L. salmonis*, as well as the numbers of *Caligus* sp. lice were recorded. The installation was then run the following day, with the treatment water at 14 degrees C. (ambient sea temperature), 21 degrees C., 26 degrees C., 30 degrees C. and 33 degrees C. Post-treatment lice counts were then made on samples of treated fish.

In Trial 2, fish were treated at 32 degrees C. Following treatment of approximately 3,000 fish (weighing 3-4 kg each), the roll of filter paper in the sea lice separator was examined and samples removed for close examination and estimation of number of lice removed following the treatment.

Results and Discussion

The approximate travel time through the fish slide was 22 to 25 seconds.

TABLE 1

Trial 1: The results of Trial 1 are shown in Table 1.
Average Numbers of Lice per Fish

| Treatment Conditions | Chalimus | Mobiles | Adult Females | *Caligus* | All Stages |
|---|---|---|---|---|---|
| Pre-Treatment Count | 26.6 | 23.1 | 3 | 0.5 | 53.2 |
| Treatment at 14.4° C. | 11.8 | 6.2 | 1.3 | 0 | 19.3 |
| Treatment at 21.0° C. | 7.4 | 4.4 | 1.6 | 0 | 13.4 |
| Treatment at 26° C. | 4.9 | 4.4 | 0.7 | 0 | 10.0 |
| Treatment at 30° C. | 6.1 | 1.9 | 0.2 | 0 | 8.2 |
| Treatment at 33° C. | 5.3 | 1.4 | 0.4 | 0 | 7.1 |

As anticipated, there were significant numbers of all stages of lice removed with increasing temperature of the treatment water. It was also interesting to note that a significant reduction in lice load occurred at 14.4 C (ambient sea temperature); that is without any heat being applied to the treatment water. This is believed to be due the pumping action of moving the fish from the cage into the fish pump and then lifting them to the seawater separator at the entrance to the treatment section.

A lice filter bag was installed to facilitate removal of lice coming aboard the barge with the seawater. This lice filter bag was examined, and large numbers of lice had indeed been removed from the fish during the pumping process.

The fact that relatively fewer of the chalimus stages appear to be removed during the treatment process is believed to be due to new settlement that may have occurred between the initial pre-treatment counts 24+ hours earlier and when the fish were actually treated the next day. As well, chalimus stages are known to be more difficult to remove. However, when fully operational, the ongoing treatment process is expected to result in an overall reduction in farm lice load, with a consequent reduction in lice infection pressure. Specifically, removal of gravid, adult females interrupts the infection process and settlement of new larval chalimus stages.

TABLE 2

Trial 2: Counts of sea lice on four samples of filter paper were taken.
The counts are shown in table 2

| Count of Preadult & Adult Lice | Size of Filter Paper (square inches) |
|---|---|
| 6 | 10 |
| 8 | 7.5 |
| 5 | 16 |
| 27 | 20 |

The data in table 2 gives a total of 46 preadults and adults on 53.5 square inches of filter paper, and an average of 0.86 lice per square inch. This data can be extrapolated as follows: The roll of filter paper is 250 yards long (750 feet or 9000 inches) and the entire roll was used during the trial. The filter paper is 28 inches wide but only 22 inches of the filter paper catches the lice (the outside 3 inches on either side does not contain lice due to the geometry of the filter). The total area for the entire roll of filter paper is 198,000 square inches (22 inches×9000 inches). Approximately 3,000 fish were treated during the trial. This equates to 66 square inches of filter paper per fish treated. Thus 56.76 lice were removed per fish (66 square inches per fish×0.86 lice per square inch).

While the above description provides examples of one or more processes or apparatuses, it will be appreciated that other processes or apparatuses may be within the scope of the accompanying claims.

What is claimed is:

1. A fish delousing installation, the fish delousing installation comprising:
   a warm water source;
   a fish slide for fish to slide down, the fish slide having a fish inlet, a fish outlet, and a slide length defined therebetween, the fish slide having a negative slope along the entirety of the slide length;
   a plurality of shower nozzles in communication with the warm water source and positioned to shower the fish with warm water as the fish slide from the fish inlet to the fish outlet, wherein the shower nozzles span at most a 270° upper circumferential of the fish slide;
   a seawater separator upstream of the fish inlet for separating sea water from the fish prior to the fish entering the fish slide; a used warm water separator downstream of the fish outlet for separating used warm water from the fish after the fish have exited the fish slide; a sea lice separator downstream of the used warm water separator for removing sea lice from the used warm water; and a recycle line downstream of the sea lice separator for feeding used and deloused warm water back to the warm water source.

2. The fish delousing installation of claim 1, wherein the slide is tubular.

3. The fish delousing installation of claim 1, wherein: the shower nozzles are positioned at a plurality of spaced apart positions along the slide length, the shower nozzles span a majority of the slide length, and the shower nozzles are positioned to shower the fish generally continually as they slide down the length from the fish inlet to the fish outlet.

4. The fish delousing installation of claim 1, wherein the fish slide has a width transverse to the slide length, and the shower nozzles are positioned at a plurality of spaced apart positions along the width.

5. The fish delousing installation of claim 1, wherein the fish slide comprises at least one pipe through which the fish slide, and wherein the at least one pipe comprises at least one inner pipe through which the fish slide, and at least one outer pipe concentric with the inner pipe and defining an annular conduit between the inner pipe and the outer pipe, and wherein the warm water source is in communication with the annular conduit, and the shower nozzles each comprise an aperture through a wall thickness of the inner pipe.

6. The fish delousing installation of claim 1, wherein the fish slide has an upstream portion of a first negative slope and a downstream portion of a second negative slope that is less than the first negative slope.

7. The fish delousing installation of claim 1, wherein the slide length and slope of the fish slide are tuned so that a fish transit time between the fish inlet and the fish outlet is less than 30 seconds, and wherein the warm water source maintains the warm water at between 30 degrees C. and 40 degrees C.

8. The fish delousing installation of claim 1, wherein the warm water source maintains the warm water at a temperature of between 20 degrees Celsius and 40 degrees Celsius.

9. The fish delousing installation of claim 1, wherein the slide length is at least 72 feet, and
wherein the fish slide has a slide footprint, the slide footprint has a footprint length, and the fish slide includes a plurality of bends such that the footprint length is less than the slide length.

* * * * *